Sept. 12, 1961  T. F. PAULS  2,999,304
METHOD OF MANUFACTURING HEAT EXCHANGERS
Filed Jan. 29, 1960  2 Sheets-Sheet 1

*INVENTOR.*
THERON F. PAULS
BY
*ATTORNEYS*

Sept. 12, 1961      T. F. PAULS      2,999,304
METHOD OF MANUFACTURING HEAT EXCHANGERS
Filed Jan. 29, 1960      2 Sheets-Sheet 2
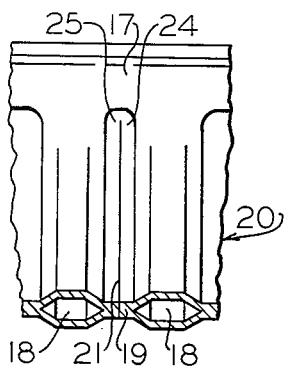
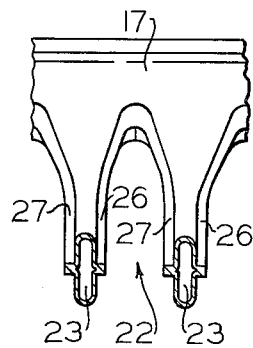
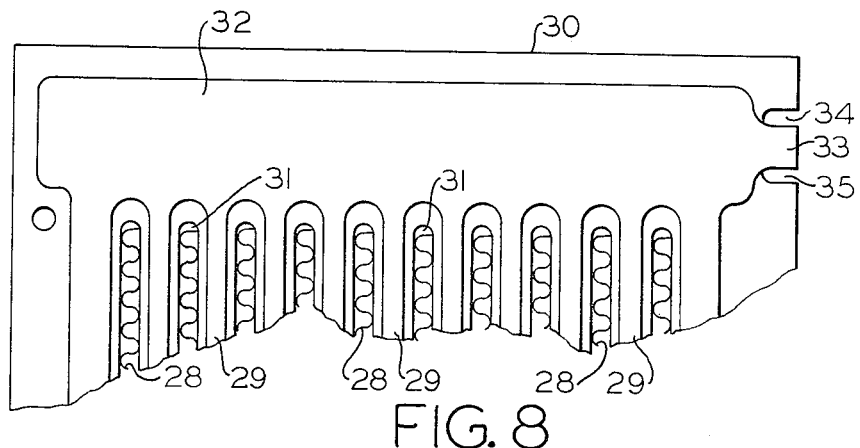
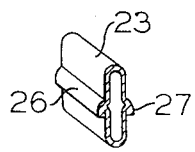
INVENTOR.
THERON F. PAULS
BY
ATTORNEYS United States Patent Office 2,999,304
Patented Sept. 12, 1961

2,999,304
METHOD OF MANUFACTURING
HEAT EXCHANGERS
Theron F. Pauls, Alton, Ill., assignor to Olin Mathieson Chemical Corporation, East Alton, Ill., a corporation of Virginia
Filed Jan. 29, 1960, Ser. No. 5,534
13 Claims. (Cl. 29—157.3)

This invention relates to a heat exchanger construction and more particularly to the art of manufacturing a multiple parallel tube type of heat exchanger unit. This application is a continuation-in-part of co-pending application Serial No. 663,062 filed June 3, 1957.

A commonly used and effective type of heat exchanger construction for evaporators, air conditioners, condensers, internal engine cooling radiators, such as automobile radiators, or for space heating such as steam radiators, and the like, is formed of sheet metal and includes a number of conduits generally in a parallel spaced arrangement extending from a first or intake header to a second or outlet header. One or more of such sheet metal units may be employed; and the conduits or tubes serve to carry within a confined heat exchange medium such as water, steam, refrigerant coolant, or the like, in conductive relationship with another medium such as air or other gas passing between the tubes. This type of construction fabricated from sheet metal is typical of automobile radiators, for example, where the heated water issues from the cooling block of the engine with the aid of a pump, first enters one of two headers, and then through a great number of thin-walled, relatively flat, closely spaced tubes between which cooling air is blown and which extend usually vertically from one to the other headers. Condensers are also frequently of this same type of construction.

According to one known method of manufacture as illustrated in U.S. Patent 2,690,002, this type of heat exchanger unit may be readily manufactured to provide a great multiplicity of tubes in a sheet of metal. This method involves emplacement of a suitable predetermined pattern of weld preventive between component sheets, pressure welding in all adjoining areas except at those separated by the preventive, and inflation along the preventive to erect tubes integral with the resultant tubed plate. Full advantage heretofore has not been taken of this method inasmuch as the tubes formed are of rather flat or oval shape with the major dimensions lying within or parallel to the metal plate in which the tubes are formed. In many applications it is desired that the tubes extend not only longitudinally but also extend perpendicularly out of the plate to a considerable extent so as to place a greater number of the tubes in spaced parallel relationship rather than a lesser number in the same plane. This design adapts the units to fabrication as single pieces of large size, a lesser number of which may then be put together for installations where the external medium passes through perforations of the plate transversely to it rather than passing parallel to the plate along its surfaces.

In the aforesaid co-pending application Serial No. 663,062 there is disclosed a novel heat exchanger structure obtained from seamless sheet metal panels or plates having relatively shallow passageways and intervening webbing. In accordance with the method disclosed therein the webbing is subjected to a reduction in thickness, such as by swaging in such a manner so as to reshape the passageways to more fully extend them out of the faces of said sheet. The resultant tubes are of relatively oblong shape extending in a direction transverse to the panel from which the tubes are formed integrally along the panel. This reshaping is accomplished by swaging, coining, or forging operation which thins the metal between tubes and narrows the dimension between the tubes or passageways in the plane of the panel or sheet while at the same time constraining the dimension of the tube to protrude further beyond or out of the face of the panel, but without any attended reduction in the overall width of the initial blank.

In accordance with this invention, the panel of the aforesaid co-pending application is obtained from the same type of sheet metal panel or plate having relatively shallow passageways disposed therein and having a solid intervening webbing or web portions between and circumscribing the passageways. This panel, as in the aforesaid co-pending application, is obtained in accordance with the teachings of the aforementioned U.S. Patent No. 2,690,002 wherein the passageways in embryonic form are defined by an included thin layer or stratum of weld-preventing material such as graphite or the like. However, transverse air duct perforations are constructed in accordance with this invention by first slitting the sheet in the solid web portions between the tubes to provide a cut through the panel, and then separating the edges, formed in the panel, adjacent the cut sufficiently to substantially alter the cross-sectional configuration or the portion of the passageways adjacent the cut. During separation, the portions of the passageways adjacent the cut are reshaped to an oblong configuration having its major axis extending in a direction transverse to the panel.

Where a more greatly extended fin surface is desired, secondary heat dissipating fins, such as a closely corrugated or pleated fin stock may be inserted and positioned between the separated edges of the cut and suitably secured therein.

Accordingly, it is an object of this invention to provide a novel method for simplifying the making of tubular heat exchanger cores for automobile heat exchanger, radiator cores and the like.

A further object of this invention is to provide a novel method for constructing a heat exchanger unit in which a greater number of conduits are integrated into a single structural member relatively free from seams and joints.

Other objects and advantages will become more apparent from the following description and drawings in which:

FIGURE 5 is a perspective view illustrating a fragment of a sheet metal unit similar to that depicted in FIGURE 2 showing one step of another embodiment of this invention;

FIGURE 6 is a perspective view illustrating a subsequent step in the processing of the fragment of FIGURE 5 in accordance with this invention;

FIGURE 7 is a fragmentary view in perspective of a modification in subsequent processing of a fragmentary portion of the unit depicted in FIGURE 6; and FIGURE 8 is a side elevational view of a portion of a panel fabricated in accordance with this invention.

Figure 1:
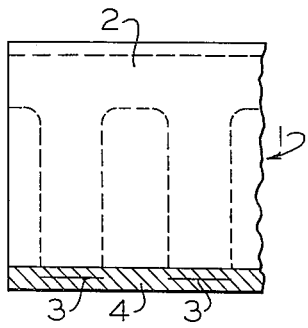
FIGURE 1 is a perspective view of a pressure-welded panel made according to the aforementioned U.S. Patent No. 2,690,002 illustrating a preliminary construction from which one embodiment of this invention may be fabricated.
Figure 2:
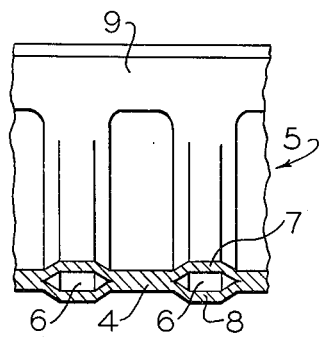
FIGURE 2 is a perspective view of an adjoining fragment of a sheet metal unit in a subsequent stage of fabrication still according to the aforementioned prior art patent.

Referring to the drawings, in FIGURE 1 there is shown a preferred form of blank or panel 1 suitable for practice of this invention. This panel is characterized by a pattern 2 including certain unjoined portions between the outer faces of the blank 1 whereat the blank is laminated so as to include spaced parallel parted or laminated portions 3 and also intervening and surrounding circumscribing web portions 4 at which the blank remains unparted. As shown in FIGURE 2, the parted portions 3 are adapted for development by fluid inflation of an internal passageway 6 forming part of a preliminary conduit system 9 evidenced by corresponding rather shallow bulges 7 and 8 on the surface and out of the faces of the intermediate product 5. Although inflation involving the admission of fluid under pressure to the interior surfaces at the lamina 3 which forces these apart to produce a preliminary distention along the internal passageways 6 is contemplated as a preferred mode of passageway generation, other flat passageway containing blanks are also contemplated. In any event, unparted portions 4 remain undistended, and separate the passageways not only from each other but also from any intervening opening in the blank.

Figure 3:
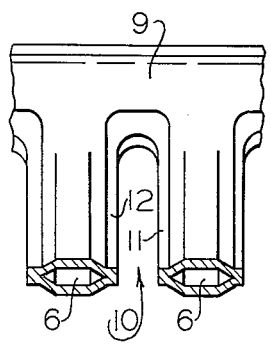
FIGURE 3 is a perspective view of the fragment of FIGURE 2 illustrating a step of one embodiment of this invention.
Figure 4:
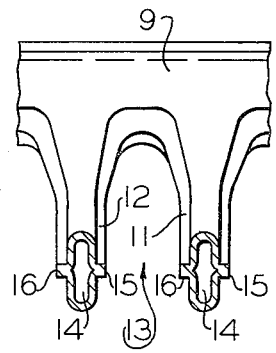
FIGURE 4 is a perspective view of the fragment of FIGURE 3 illustrating a subsequent step of one embodiment of this invention.

As illustrated in FIGURE 3, blank 5 is cut in the solid web portions 4 between the adjacent rectilinear and spaced tubes 6 by conventional means, such as slitting, punching and the like, so as to form an air duct 10 between the adjacent tubes. The specific spacing desired and the size and dimensions of the air duct are necessarily dependent upon the ultimate applications desired for the unit and will determine the disposition of tubes and webbing therein. Subsequent to the cutting operation, the edges 11 and 12 adjacent the cut or air duct 10 are then separated sufficiently to substantially alter the cross-sectional configuration of tubes 6. This separation, of the edges adjacent the cut, may be accomplished by any suitable and conventional spreader means such as mandrels, which spread the spaces between the tubes while simultaneously reforming the tubes so as to have their greatest dimension cross-wise the radiator plate.

For example, these spreader means may be any tool suitably shaped which upon being forced through the air duct 10 will cause edges 11 and 12 to be separated or spread further away from each other while simultaneously deforming adjacent spaced tubes 6 into an elongated configuration. This may be accomplished by various tools which are conventional and well known in the art. Generally, the tool will have a length coextending with the portions of tubes 6 which are to be reformed into the flattened or elongated configuration embodied in the reshaped tubes 14. Also, the thickness or width of the tool will be such as to impart the necessary separation or spreading of the web edges 11 and 12 required to obtain the reforming of tubes 6 into their reshaped configuration. In addition, the tool is preferably provided with a tapering leading edge to facilitate its insertion into air duct 10. Reforming of the tubes 6 is obtained by forcing the tool through air duct 10 whereby spreading of edges 11 and 12 occurs with simultaneous reforming of tubes 6.

The new cross-sectional configuration forms oblong tubes 14 having its major dimension or axis transverse to the plane of the tube. This oblong configuration results, upon separating edges 11 and 12, by decreasing the dimension of tubes 6 within the plane of the blank or panel and increasing its dimension in the direction transverse the panel so as to further bulge out the distended tubes out of the faces of the panel. Preferably the dimension of the new configuration of tubes will be in the direction perpendicular to the panel or blank but, if desired, may be shaped to other angles to provide any desired trimming for air flow through the enlarged air duct 13. As will be understood, the cutting between rectilinear tubes 6 must be and is restricted to the solid seamless web portions between the tubes so as not to penetrate or puncture the passageway system. In addition, cutting along the solid web portions provides flanges 15 and 16 extending from flattened reshaped tubes 14 to facilitate positioning and securement of secondary heat exchanger fin stock if desired.

In a preferred embodiment of this invention, as illustrated in FIGURE 5, the seamless one-piece sheet metal blank obtained by the method of the aforesaid U.S. Patent 2,690,002 is provided with an internally disposed interconnected system of passageways 17 which comprises at least two or any desired plurality of rectilinear passages 18. In this preferred embodiment, passages 18 are in spaced parallel relationship and separated by narrow solid web portions 19. The disposition and dimensions of passages 18 and web portions 19, as with the previous embodiment, must necessarily be dictated by intended applications but preferably are so disposed where the passages 18 comprise substantially the major portion of the blank 20 transverse the direction in which tubes or passages 18 are extending. As illustrated in the embodiment of FIGURE 5, the width of the solid web portion 18 will have a dimension substantially twice the flanges desired on the tubes or passages 18 in the ultimately fabricated article. To illustrate the invention with respect to this embodiment, solid web portion 19 is cut or slit at 21 midway between tubes or passages 18. Subsequent to the slitting the formed edges adjacent cut 21 are then separated to provide an air duct 22 while simultaneously reshaping tubes 18 into the oblong passages 23. The divided portions 24 and 25 of solid web portion 19 of the unit form, respectively, the flanges 26 and 27 of the oblong passages 23. As with the preceding embodiment, these flanges may be and are preferably employed to facilitate the mounting of secondary fin stock, but if desired, these flanges may be folded over, as in FIGURE 7, against the side of oblong passage 23 and the tube stock reshaped to eliminate or reduce the projection of the flanges out of the tube so as to form a substantially uniform outer wall about the oblong passage.

If desired, and preferably, secondary heat exchange or heat dissipating fins 28 may be inserted and positioned in the spread spaces between oblong passages 29 and suitably secured thereto by conventional means, such as solder, brazing and the like interposed between the panel and the fin stock. In one form this fin stock may be formed by bending strips of highly conducting metal into a serpentine form. In order to facilitate positioning of the fin stock in the panel, the serpentine fin stock may be provided with notches at its crest so as to receive therein the flanges extending from the oblong tubes 29. Also if desired, the fin stock may be perforated in the pleat or appropriately shaped, in the pleat, by stamping in the straight portions to provide additional deflection means for the passage of air through the ducts or spread spaces between the passages.

In FIGURE 8, showing a larger portion of the panel, the embodiment or panel 30 depicted therein has a plurality of parallel rectilinear tubes 29 shaped into an oblong configuration to provide spread spaces 31 between the tubes wherein the fin stock 28 is positioned. As illustrated, one end of the panel has a connecting header 32 and a supply or discharge connection 33 which is preferably cut free at 34 and 35 from the surrounding panel and rounded to permit coupling with any suitable supply or discharge line. Similar provisions of an interconnecting conduit and inlet connection may be provided at the bottom of panel or blank 30.

In the manufacture of automobile radiators and the like, a plurality of the resultant blanks 30 may be assembled in face to face relationship with the passages and the spread spaces or air ducts in alignment with the corresponding passages and ducts in adjacent panels, or the passages of one panel may be in overlapping relationship with passages of adjacent panels, wherein secondary fin stock is individually inserted in each panel prior to assembly. In a still alternate procedure, the plurality of panels may be assembled in face to face relationship prior to secondary fin stock wherein the passages and the separated spaces of one panel are in alignment with the corresponding passages of the adjacent panels. Thereafter, appropriate secondary fin stock may be inserted in the spread spaces, between passages, so that the fin stock will be coextensive with the assembled plurality of panels, that is the fin stock extends through all of the panels.

Although the invention has been described with reference to specific embodiments, materials and details, various modifications and changes, within the scope of this invention, will be apparent to one skilled in the art, and are contemplated to be embraced within the invention.

What is claimed is:

1. In a method of making a hollow metal heat exchanger from a seamless one-piece sheet metal blank having internally disposed therein a system of distended tubular passageways bulged out of the face of said blank and circumscribed by solid web portions of said blank wherein said system comprises at least two spaced and adjacent rectilinear tubular passages, a combination of steps comprising cutting the solid web portion of said blank between and adjacent said passages to form a cut therethrough, and separating the edges of said blank adjacent said cut away from each other substantially in the plane of said blank sufficiently to substantially alter the cross-sectional configuration of said passages adjacent said cut so as to increase their distention out of the face of said blank.

2. The method of claim 1 wherein said separating is sufficient to elongate a cross-sectional configuration of said passages in a direction transverse the plane of said blank.

3. The method of claim 2 including the step of disposing a pleated secondary heat exchange fin stock between the separated edge of said cut, and securing said fin stock to said separated edges.

4. The method of claim 3 wherein said passages are elongated in said transverse direction.

5. The method of claim 4 wherein said passages are parallel to each other.

6. The method of claim 5 wherein said passages are closely spaced relatively to each other.

7. The method of claim 6 wherein said transverse direction is perpendicular relative to said blank at the point where said passages bulge out of the face of said blank.

8. In a method of making a hollow metal heat exchanger from a seamless one-piece sheet metal blank having internally disposed therein a system of interconnected tubular passageways bulged out of the faces of said blank and circumscribed by solid web portions of said blank wherein said system comprises at least two closely spaced parallel rectilinear passages separated by narrow solid web portions wherein said passages comprise substantially the major portion of said blank transverse the direction in which said tubes are extending, the combination of steps comprising slitting the solid web portion of said blank between adjacent rectilinear tubular passages to form a cut therethrough, separating the edges of said blank adjacent said cut away from each other substantially in the plane of said blank, sufficiently to alter the cross-sectional configuration of said passages to increase their distention out of the faces of said blank.

9. The method of claim 8 wherein said separating is sufficient to elongate the cross-sectional configuration of said passages in a direction perpendicular to said blank.

10. The method of claim 9 including the step of assembling a plurality of the resultant blanks obtained therein in face to face relationship with the passages and said areas of separation of one blank in aligned relationship with corresponding passages and area of separation of adjacent blanks, positioning a pleated secondary heat exchange fin stock between the separated edges of said blanks in coextensive relationship with said assembled plurality of blanks, and securing said fin stock to the separated edges of said blanks.

11. The method of claim 2 including the step of assembling a plurality of the resultant blanks obtained therein in face to face relationship.

12. The method of claim 11 including the step of assembling a plurality of the resultant blanks obtained therein in face to face relationship with the passages and areas of separation of one blank in aligned relationship with corresponding passages and areas of separation of adjacent blanks.

13. The method of claim 11 including the steps of assembling a plurality of resultant blanks obtained therein in face to face relationship with the passages in one blank arranged in staggered relationship with corresponding passages and adjacent blanks.

References Cited in the file of this patent

UNITED STATES PATENTS

| 2,838,830 | Huggins | June 17, 1958 |
| 2,894,731 | Wurtz | July 14, 1959 |

FOREIGN PATENTS

| 214,980 | Australia | May 16, 1958 |